United States Patent
Lellouch et al.

(10) Patent No.: US 8,860,605 B2
(45) Date of Patent: Oct. 14, 2014

(54) METHOD FOR ESTIMATING THE POSITION AND THE SPEED OF A TARGET WITH A RADAR EMITTING AN OFDM WAVEFORM

(75) Inventors: Gabriel Lellouch, Paris (FR); Radmila Erkocevic-Pribic, Delfgauw (NL)

(73) Assignee: Thales Nederland B.V., Hengelo (NL)

( * ) Notice: Subject to any disclaimer, the term of this patent is extended or adjusted under 35 U.S.C. 154(b) by 918 days.

(21) Appl. No.: 12/994,335

(22) PCT Filed: May 20, 2009

(86) PCT No.: PCT/EP2009/056191
§ 371 (c)(1),
(2), (4) Date: Aug. 4, 2011

(87) PCT Pub. No.: WO2009/141408
PCT Pub. Date: Nov. 26, 2009

(65) Prior Publication Data
US 2011/0279305 A1    Nov. 17, 2011

(30) Foreign Application Priority Data

May 23, 2008 (NL) ....................................... 1035463
Aug. 19, 2008 (EP) ...................................... 08162594

(51) Int. Cl.
| | |
|---|---|
| *G01S 13/58* | (2006.01) |
| *G01S 13/08* | (2006.01) |
| *G01S 13/28* | (2006.01) |
| *G01S 13/24* | (2006.01) |
| *G01S 7/00* | (2006.01) |
| *G01S 13/02* | (2006.01) |
| *H04L 27/26* | (2006.01) |

(52) U.S. Cl.
CPC ............... *G01S 13/582* (2013.01); *G01S 13/28* (2013.01); *G01S 13/24* (2013.01); *G01S 7/003* (2013.01); *H04L 27/2601* (2013.01); *G01S 13/0209* (2013.01)

USPC ........... 342/107; 342/115; 342/118; 342/128; 342/129; 342/133

(58) Field of Classification Search
CPC ........ H04J 3/00; H04J 3/1694; H04L 5/0007; H04L 2025/03414; H04L 25/0204; H04L 27/2601; H04L 27/2636; G08G 9/02; G01C 21/00; G01S 13/04; G01S 13/584; G01S 13/66
USPC ................... 342/22, 107, 115, 118, 128–146; 370/203–210
See application file for complete search history.

(56) References Cited

U.S. PATENT DOCUMENTS 5,646,623 A * 7/1997 Walters et al. ................. 342/129
6,300,895 B1 * 10/2001 Carrara et al. ................... 342/55

(Continued)

OTHER PUBLICATIONS

Patrice Tran: "Person Localization in Adverse Complex Environment (PLACE) Frequency Agility in OFDM Active Radars," Internship at Thales Naval Nederland Engineer Degree Program at ENSTA, Paris, Oct. 2006.

(Continued)

*Primary Examiner* — Peter Bythrow
(74) *Attorney, Agent, or Firm* — Baker Hostetler LLP

(57) ABSTRACT

A method for estimating the position and the speed of a target with a radar is provided. The radar emits a waveform including a train of pulses, each pulse having an OFDM chip constructed from subcarriers, the subcarriers covering the whole bandwidth of the radar. Upon receipt of the echoed pulses, some of the subcarriers are used in a step of Doppler processing, each of the subcarriers being fixed over the pulses. Upon receipt of the echoed pulses, other subcarriers, which are not used for Doppler processing, are used in a step of High Range Resolution processing, the subcarriers being randomly distributed over the pulses.

8 Claims, 18 Drawing Sheets

(56) References Cited

U.S. PATENT DOCUMENTS

| | | | |
|---|---|---|---|
| 6,392,588 B1* | 5/2002 | Levanon | 342/202 |
| 6,720,909 B1* | 4/2004 | Dedden | 342/137 |
| 6,999,025 B2* | 2/2006 | Poullin | 342/159 |
| 7,852,955 B2* | 12/2010 | Wang et al. | 375/260 |
| 7,856,066 B2* | 12/2010 | Tanaka et al. | 375/260 |
| 7,994,969 B2* | 8/2011 | Van Caekenberghe et al. | 342/200 |
| 8,081,105 B2* | 12/2011 | Tigrek et al. | 342/105 |
| 8,441,393 B2* | 5/2013 | Strauch et al. | 342/60 |
| 2004/0066331 A1* | 4/2004 | Poullin | 342/378 |
| 2004/0257270 A1* | 12/2004 | Poullin | 342/159 |
| 2007/0285302 A1* | 12/2007 | Aarseth et al. | 342/25 R |
| 2009/0237292 A1* | 9/2009 | Tigrek et al. | 342/109 |
| 2011/0193739 A1* | 8/2011 | Strauch et al. | 342/146 |
| 2011/0279305 A1* | 11/2011 | Lellouch et al. | 342/107 |

OTHER PUBLICATIONS

Duan Junqi "Muilticarrier Coherent Pulse Shaping for Radar and Corresponding Signal Processing," Elec Measurement and Inst., IEEE 8th Int'l Conf. on ICEMI 2007, pp. 3-843 to 3-847 (Aug. 1, 2007).

Van Genderen et al., "A Multi Frequency Radar for Detecting Landmines: Design Aspects and Electrical Performance," IEEE European Microwave Cont 2001, pp. 1-4 (Oct. 1, 2001).

Lellouch et al., "OFDM Waveforms for Frequency Agility and Opportunities for Doppler Processing in Radar," IEEE Radar Conf. 2008, pp. 1-6 (May 26, 2008).

* cited by examiner

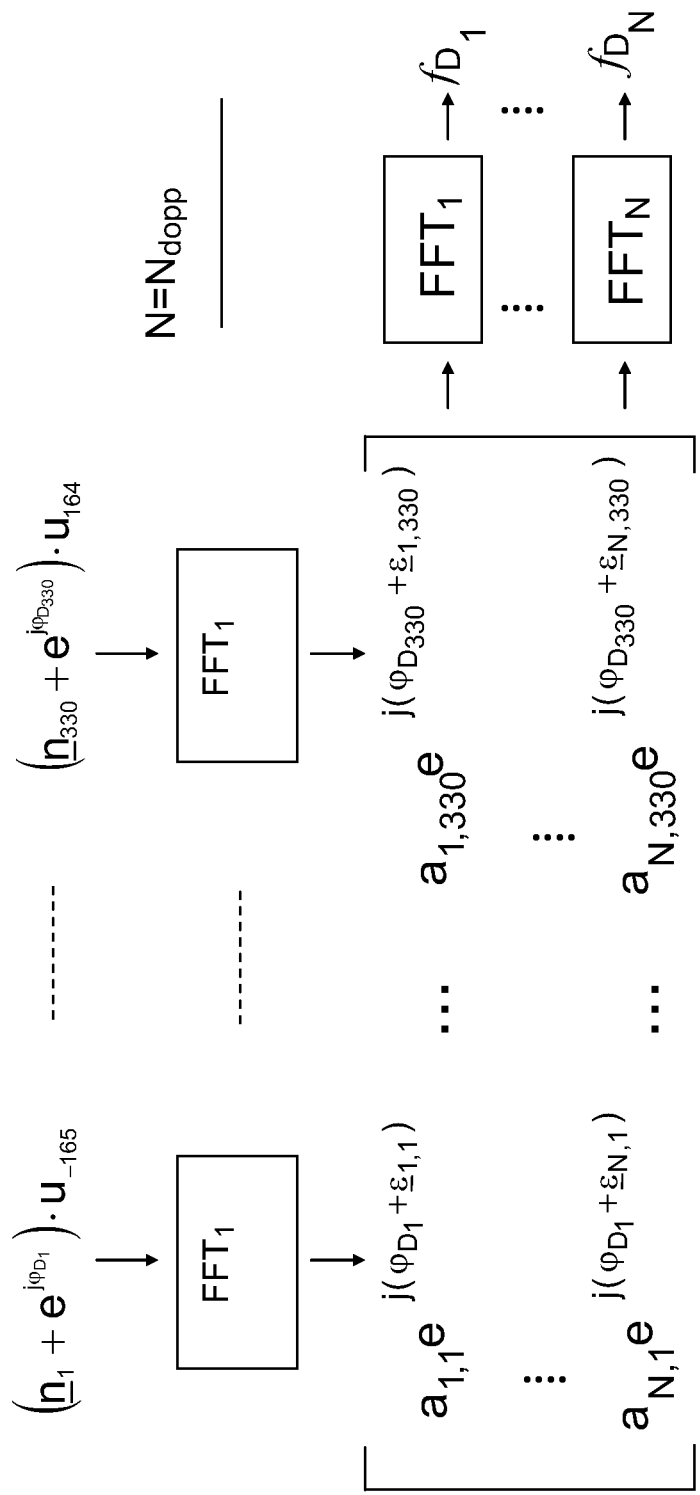

METHOD FOR ESTIMATING THE POSITION AND THE SPEED OF A TARGET WITH A RADAR EMITTING AN OFDM WAVEFORM

CROSS-REFERENCE TO RELATED APPLICATIONS

This application is a National Stage of International patent application PCT/EP2009/056191, filed on May 20, 2009, which claims priority to foreign Netherlands patent application No. NL 1035463, filed on May 23, 2008, and foreign European patent application No. EP 08162594.9, filed on Aug. 19, 2008, the disclosures of which are incorporated by reference in their entirety.

FIELD OF THE INVENTION

The present invention relates to a method for estimating the position and the speed of a target with a radar emitting a waveform of the Orthogonal Frequency Division Multiplexing type (OFDM). The invention is applicable to many radar applications.

BACKGROUND OF THE INVENTION

In modern radar networks aiming at surveillance applications, the combination of a growing number of features to face up a growing number of needs is the new challenge. The demands for better performances, faster reaction in more complex environments foster this approach. Namely, the new scenario has to circumvent electromagnetic interferences while compounding with vital resources like Doppler estimation and High Range Resolution (HRR).

The electromagnetic frequency band under use can be subject to degradation, misleading the comprehension of the environment. As a consequence, the presence of targets may not be detected. This is one of the technical problems that the present invention aims at solving. In a short range radar network for example, the source of this degradation can be either channel imperfections or mutual interferences between neighboring telecom stations. In the prior art, this situation is best avoided when the radar carrier frequency swaps within a band from emission to emission, just like in the concept of cognitive radio.

The Doppler effect is by nature a scaling of the carrier frequency proportionally to the radial speed of the target. In the prior art, when the waveform is a pulse burst or a train of pulses, the Doppler frequency is commonly obtained after comparing the phase of the received echoes with that of the local oscillator; at least when the same carrier is used along the burst. However, if the carrier frequency changes, the Doppler frequency changes accordingly and the conventional Fourier analysis is no longer adapted to perform the Doppler processing. In that respect, in the common solutions from the prior art, frequency agility and Doppler processing have always been isolated in different operational modes. This is one of the technical problems that the present invention aims at solving.

After detection, the decision to regard a target as a friend or as a foe implies that enough information over the target is known. Such a thorough radar signature is obtained when the system has a high resolution. If the processing in the receiver responsible for the range is based on the Pulse Compression (PC) technique known from the prior art, basic range resolution in the sense of the system is equivalent to wide bandwidth in the sense of the waveform. In that respect, in the common solutions from the prior art, frequency agility and HRR have always been isolated in different operational modes. This is one of the technical problems that the present invention aims at solving.

Until now, only few Mono-Carrier radar systems have been supporting frequency agility together with Doppler processing and HRR. None has ever merged them into one single operational mode. This is one of the technical problems that the present invention aims at solving.

The emergence of Multi-Carriers (MC) signals in the communications has invited the radar community to focus on these novel digital waveforms and analyze their radar properties.

Developments for ground penetrating radar applications have made use of Multi-Carrier stepped-frequency waveforms to synthesize a wide bandwidth. In that concept, each pulse consists of several widely spaced frequencies produced by different IF frequencies. The method is detailed in the article "A Multi Frequency Radar for Detecting Landmines: Design Aspects and Electrical Performance" (P. van Genderen and al., in Proceedings European Microwave Conference 2001, October 2001). However, this article focuses on HRR, it does not even address the issue of frequency agility.

The U.S. Pat. No. 6,392,588 B1 reports investigations on the Multi-Carrier Phase Coded (MCPC) waveform. It is demonstrated that the MCPC structure offers opportunities to lower the autocorrelation sidelobes and therefore enhances detection capabilities. However, this patent does not even address the issue of frequency agility.

The most famous MC waveform is the so-called Orthogonal Frequency Division Multiplexing (OFDM) waveform, which is simply generated by means of Inverse Fast Fourier Transform (IFFT), a digital technique that makes it extremely flexible. OFDM has been suggested for ultra wideband wireless communication standard 802.11a. In the article "Frequency Agility in OFDM Active Radar" (P. Tran, MSc Thesis, October 2006) the same OFDM or MCPC waveform is used to introduce the concept of digital MC agile waveform. Various agility patterns are suggested and tested. Several criteria such as spectrum occupation, cross-correlation, resolution in range and Doppler estimation are used to assess the best agile waveform for radars. This article deals with frequency agility, however it does not address the issue of combining frequency agility with Doppler processing or HRR.

SUMMARY OF THE INVENTION

The present invention aims to provide a flexible waveform which may be used to overcome at least some of the technical problems described above. At its most general, the present invention proposes a new radar waveform concept suitable for solving simultaneously interference issues by providing frequency agility together with Doppler processing and/or HRR. The concept relies on the structure of an OFDM signal as it is used in the communications, by exploiting its unique time/frequency pattern.

According to a first of its aspects, the present invention may provide a method for estimating the position and the speed of a target with a radar, the radar emitting a waveform comprising a train of pulses, each pulse comprising an OFDM chip constructed from subcarriers, the subcarriers covering the whole bandwidth of the radar. Upon receipt of the echoed pulses, some of the subcarriers are used in a step of Doppler processing, each of said subcarriers being fixed over the pulses. Other subcarriers, that are not used for Doppler processing, are used in a step of High Range Resolution processing, the said subcarriers being randomly distributed over the pulses.

Preferably, the Doppler processing may include applying an FFT on each received pulse, so as to select the subcarriers to be used. A step of compressing the pulses echoed by the target may follow the step of Doppler processing.

Preferably, a step of compressing the pulses echoed by the target may precede the step of High Range Resolution processing. The step of High Range Resolution processing may also include removing the apparent random distribution of the subcarriers.

In one exemplary embodiment, the waveform may embed messages indicating that a target has been detected, the messages being exchanged throughout a radar network. Then, the Bandwidth-Time product may be greater than $10^4$. The method may be implemented in a short range radar adapted to detect human beings.

It is to be understood that variations to the examples described below, such as would be apparent to the skilled addressee, may be made without departing from the scope of the present invention.

Thus, an advantage provided by the present invention in any of its aspects is that the combination of frequency agility and HRR is an added value for the system's reliability in the context of interferences.

BRIEF DESCRIPTION OF THE DRAWINGS

A non-limiting embodiment of the invention is described below with reference to the accompanying drawings in which:

the FIG. 1 schematically illustrates an exemplary waveform specified for a short range radar;

Figures 2A, 2B:
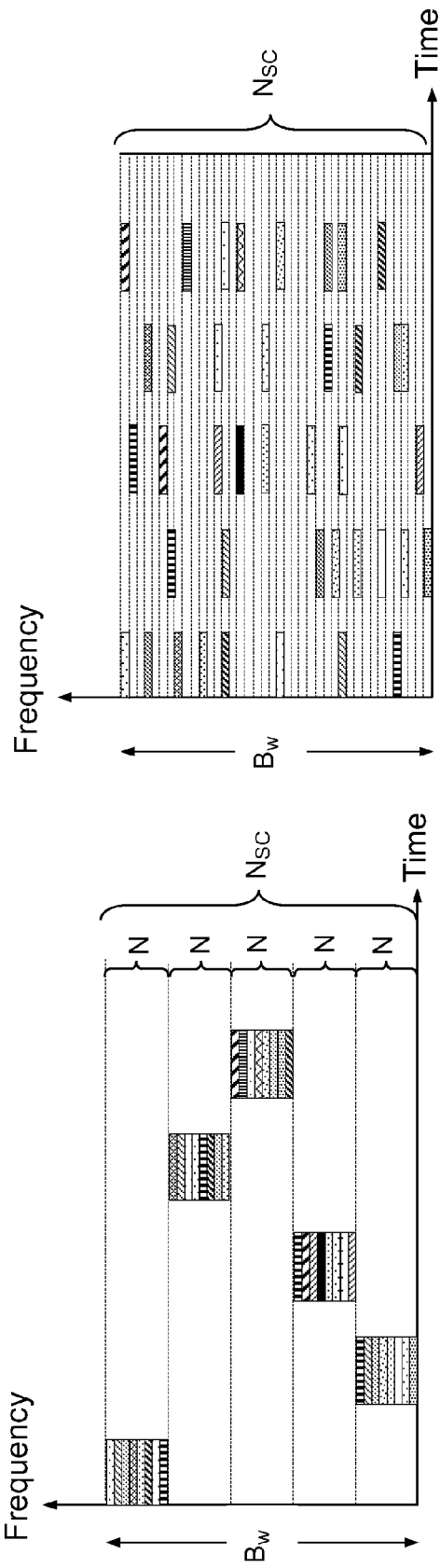
Figure 3:
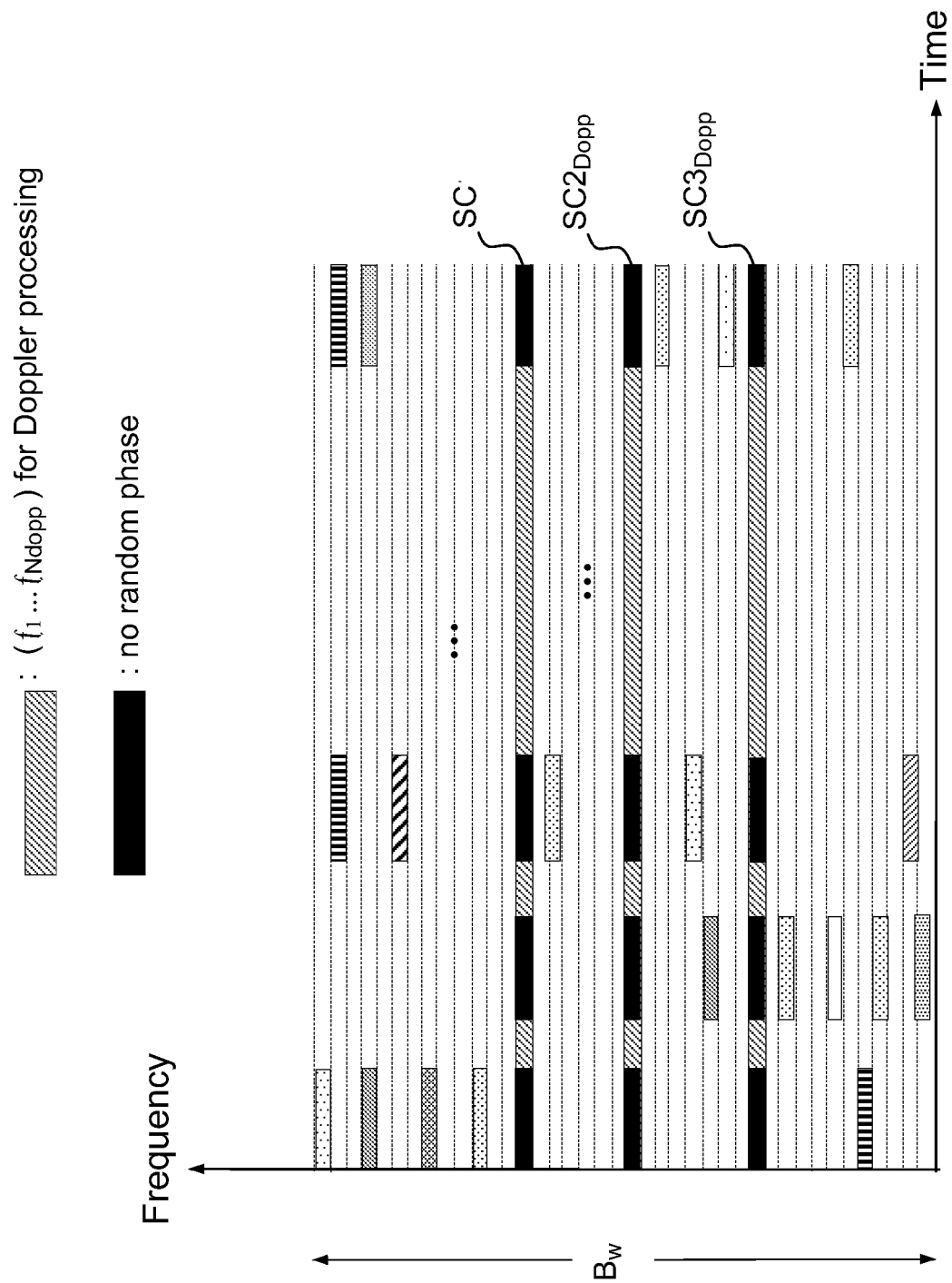
Figure 4:
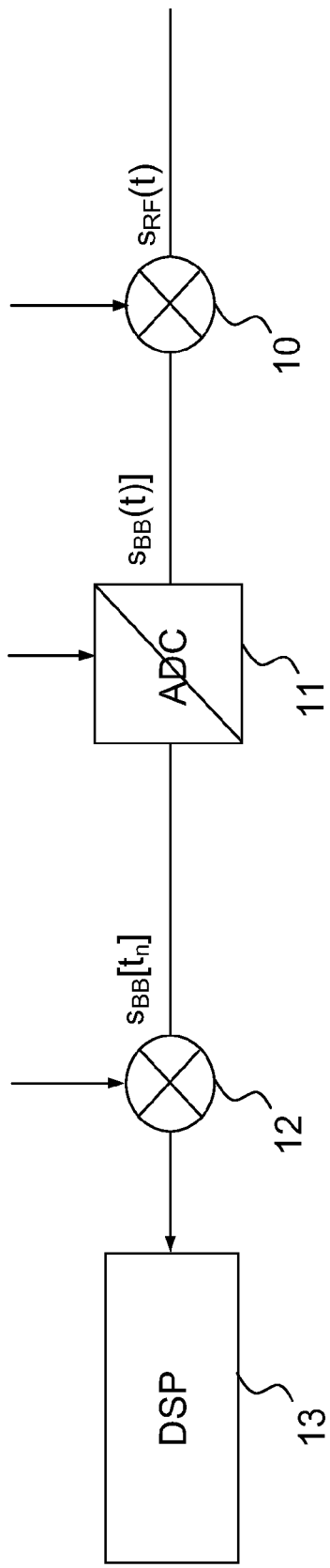
Figure 5:
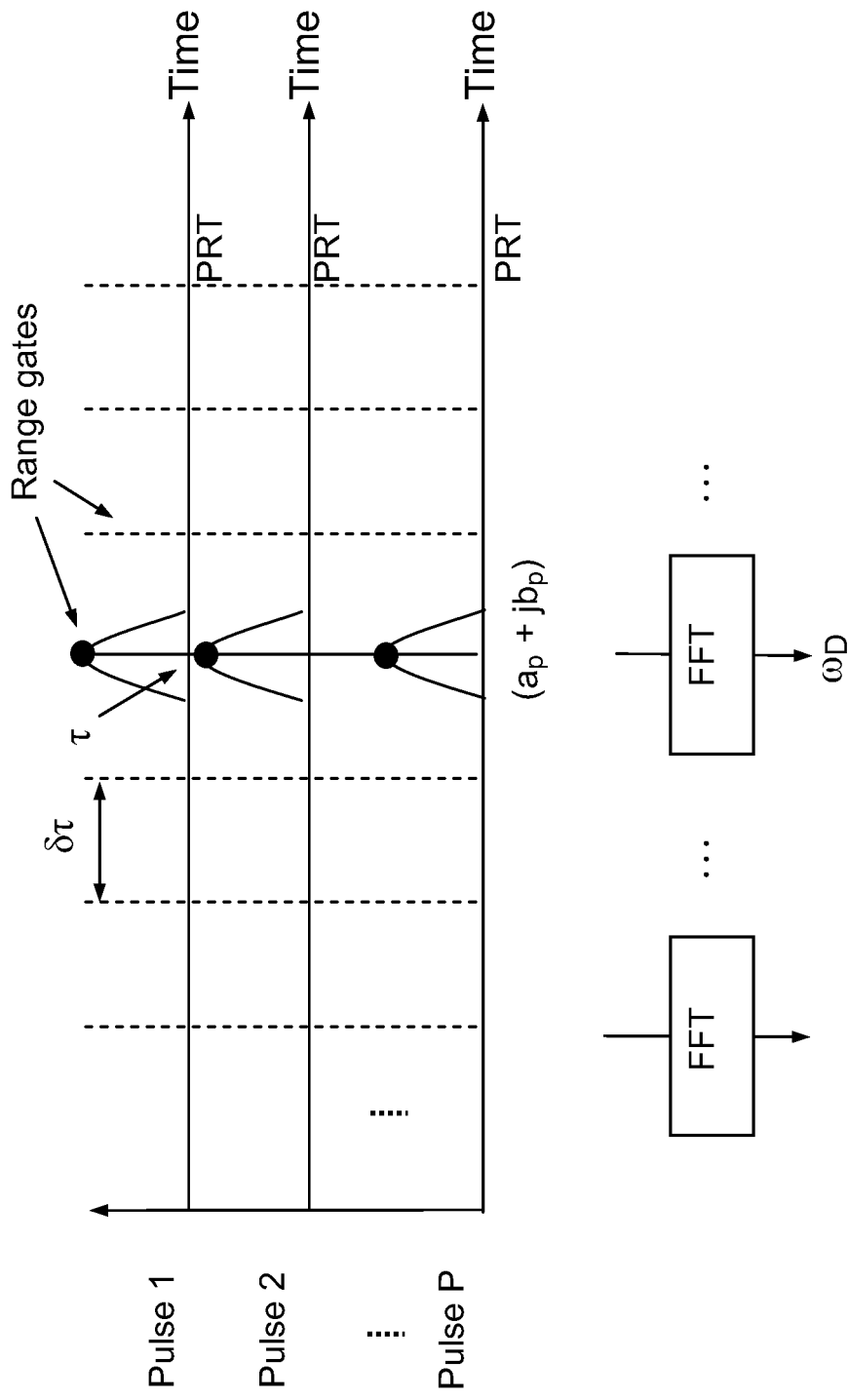
Figure 6A:
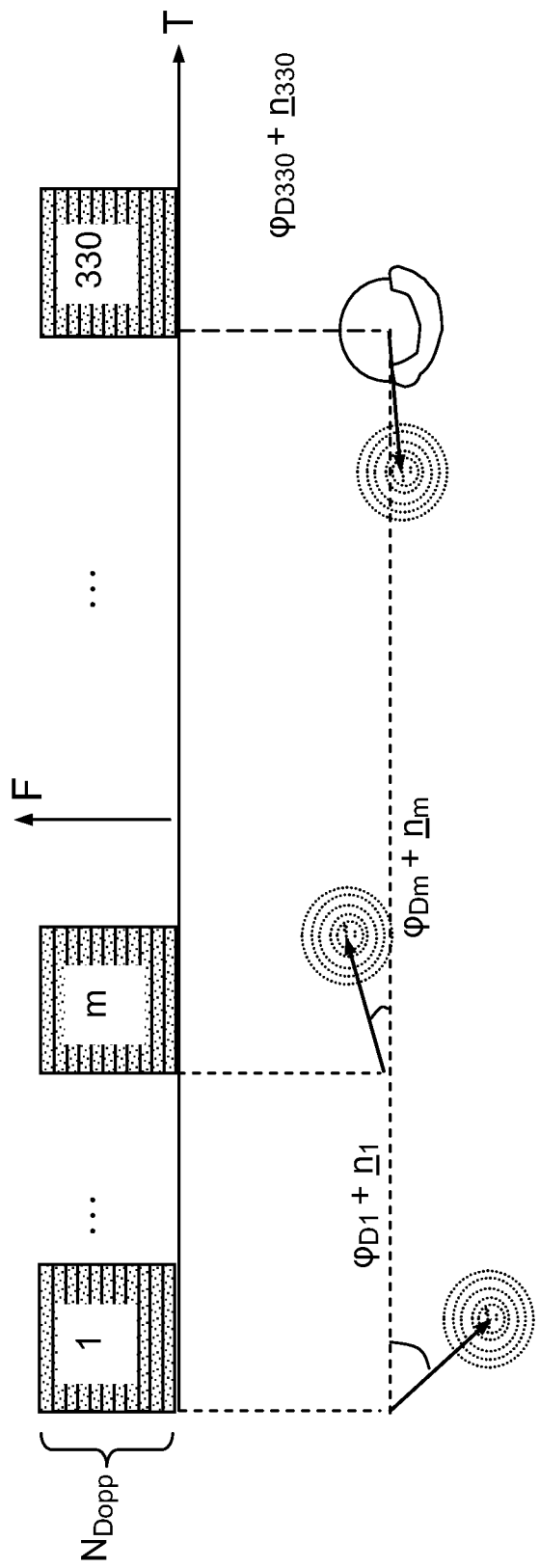
Figure 7:
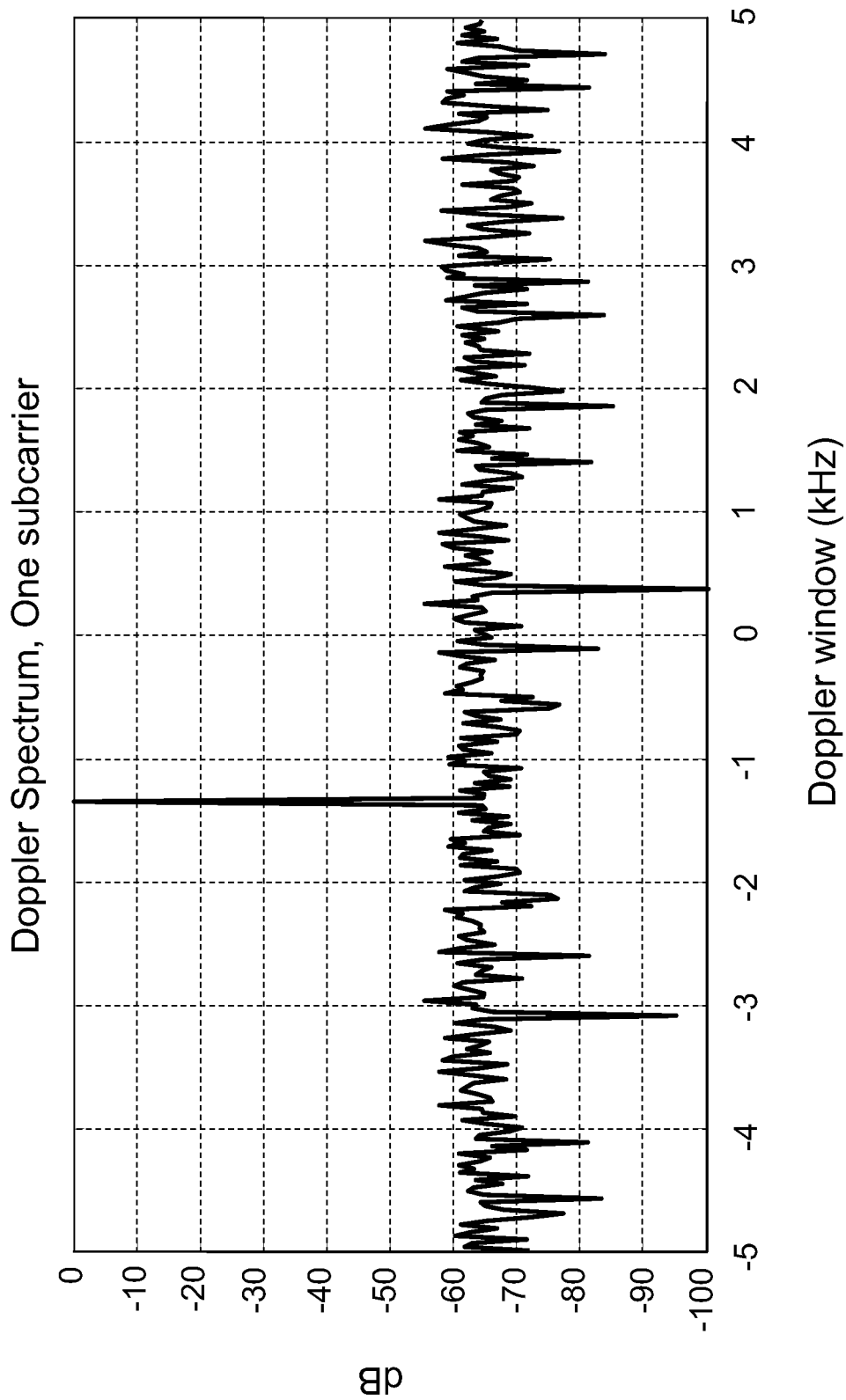
Figure 8:
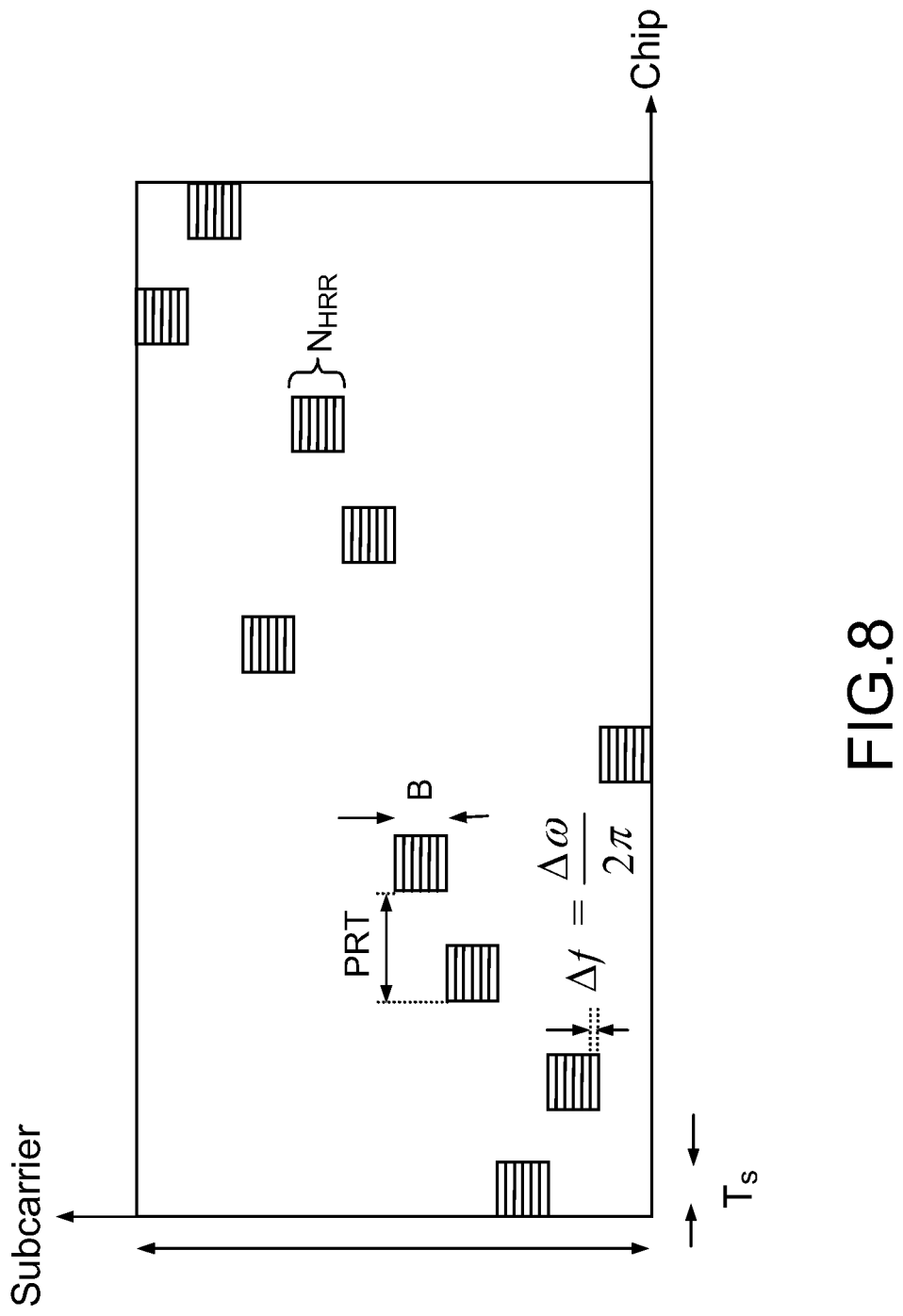
Figure 9:
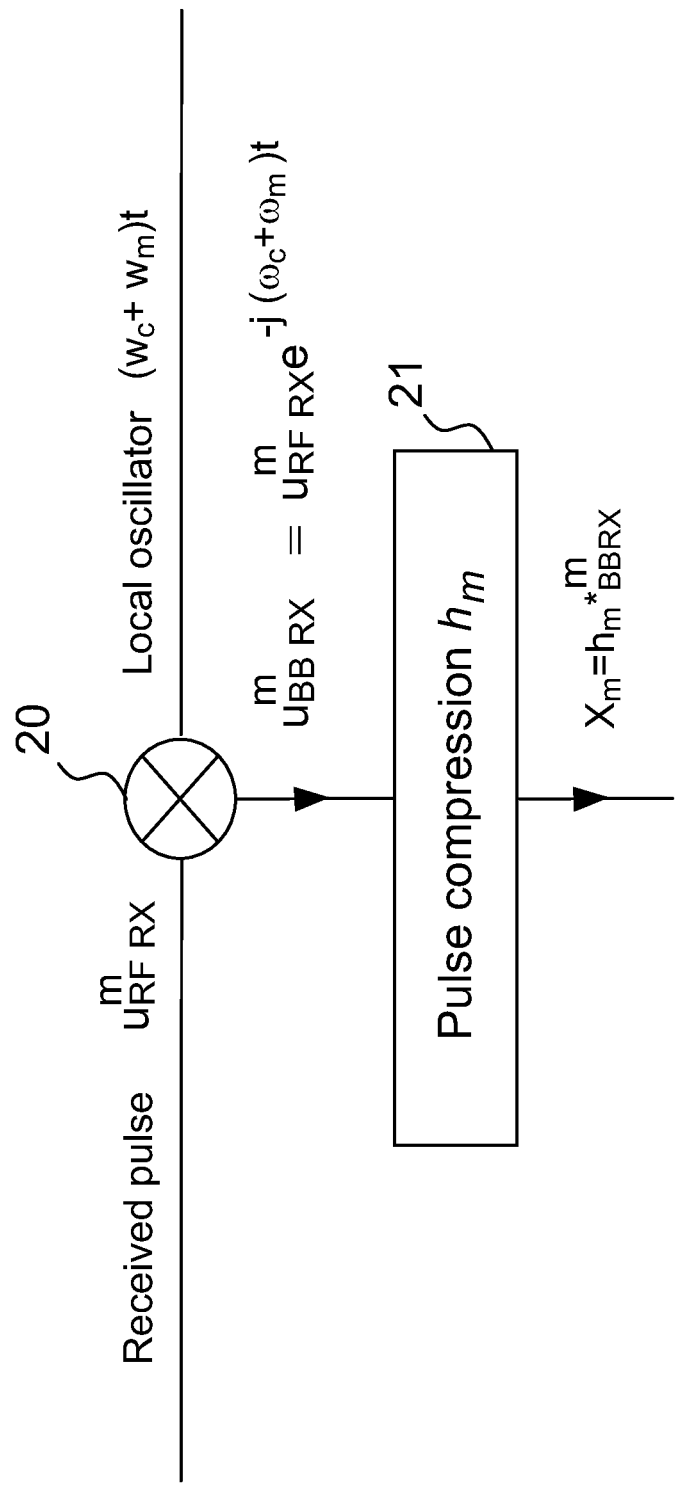
Figure 10:
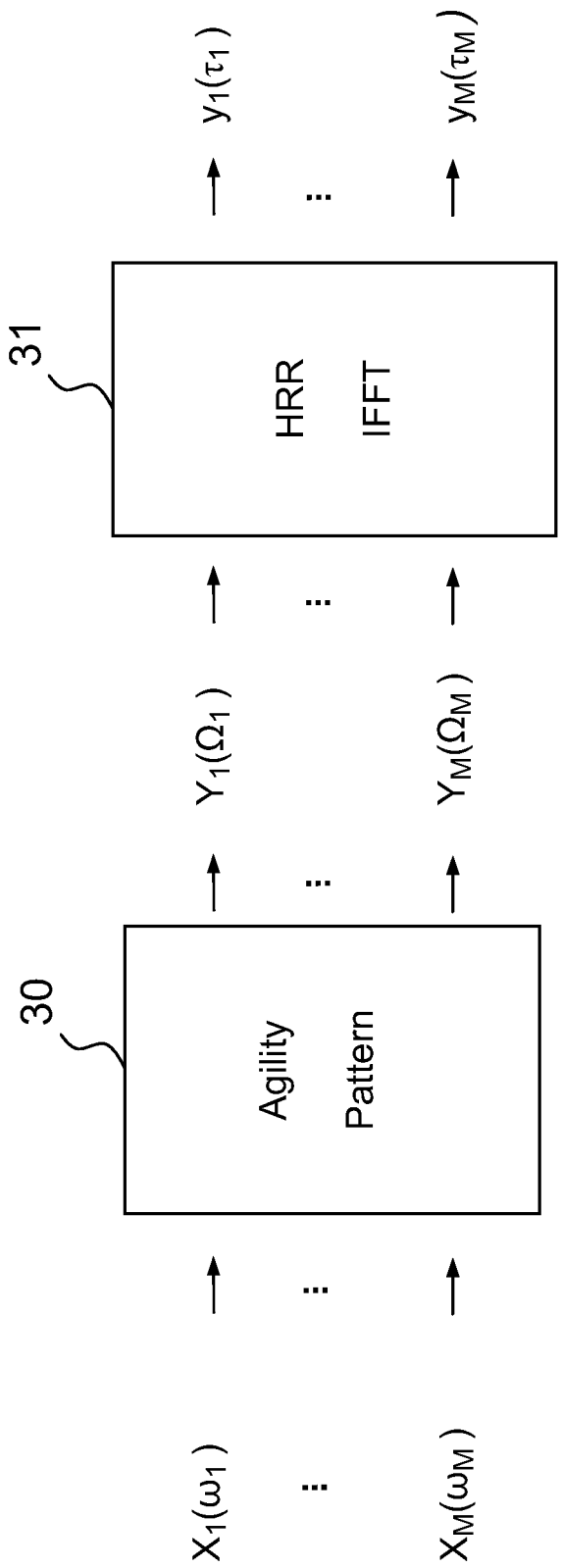
Figure 11:
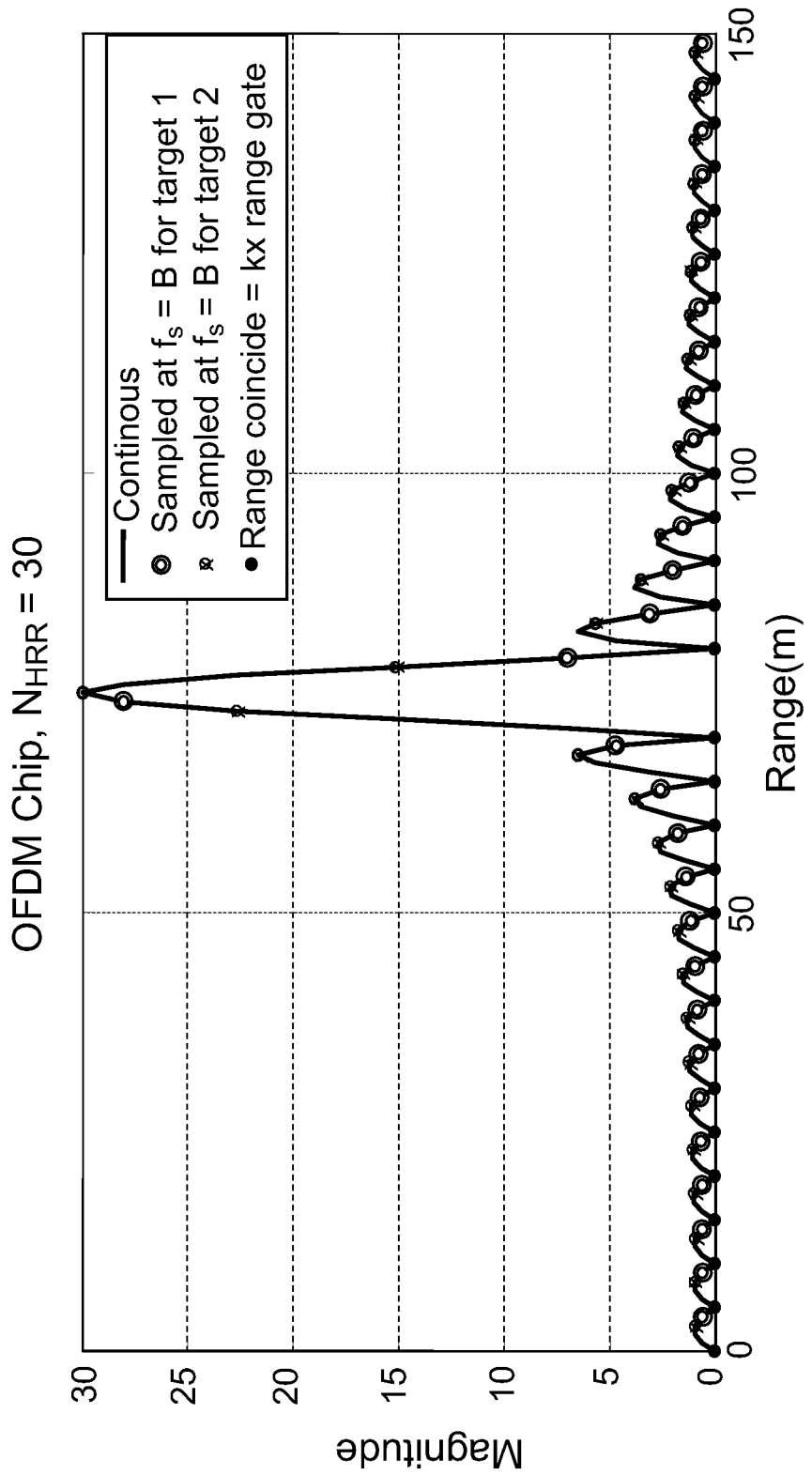
Figure 12:
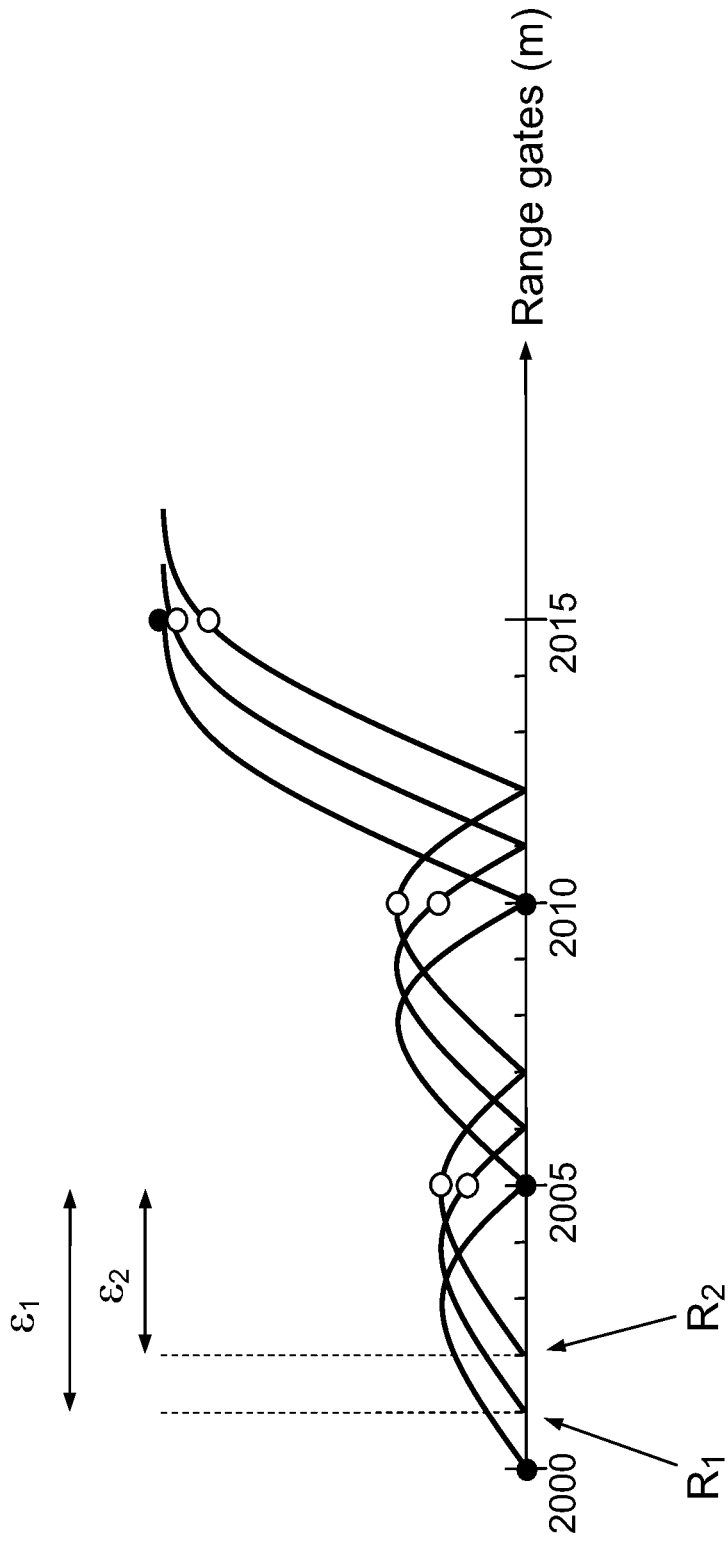
Figure 13:
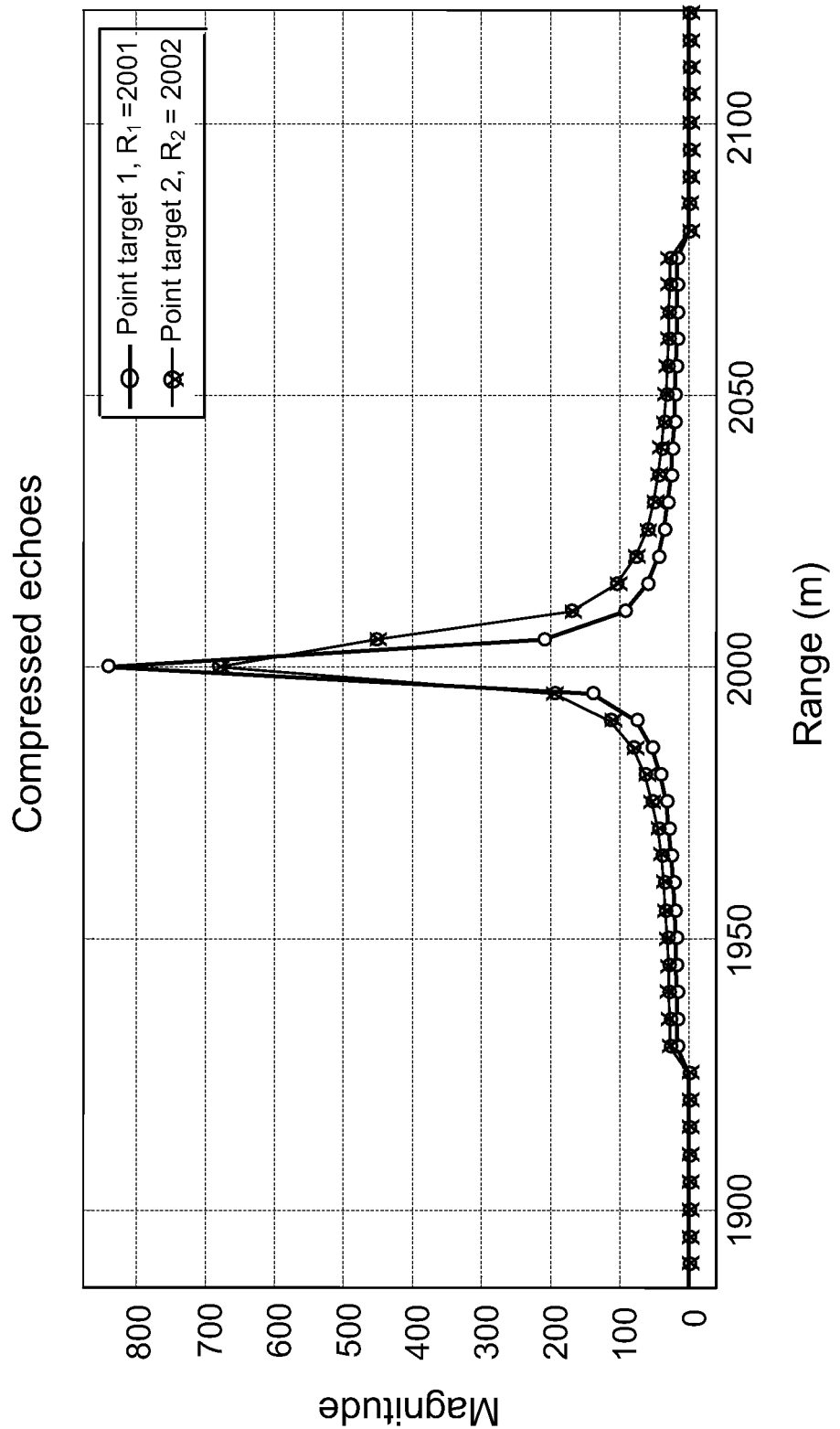
Figure 14:
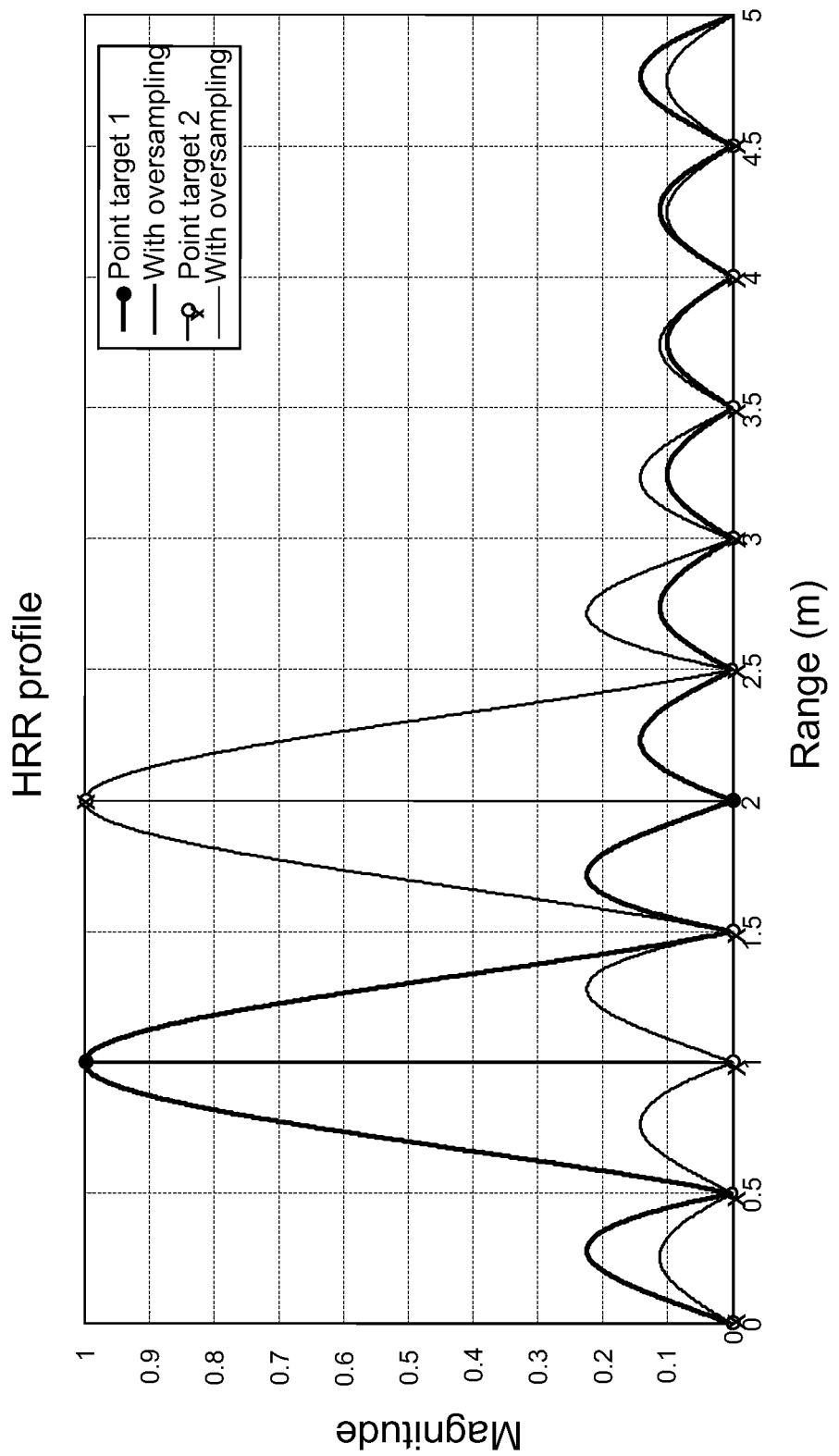
Figure 15A:
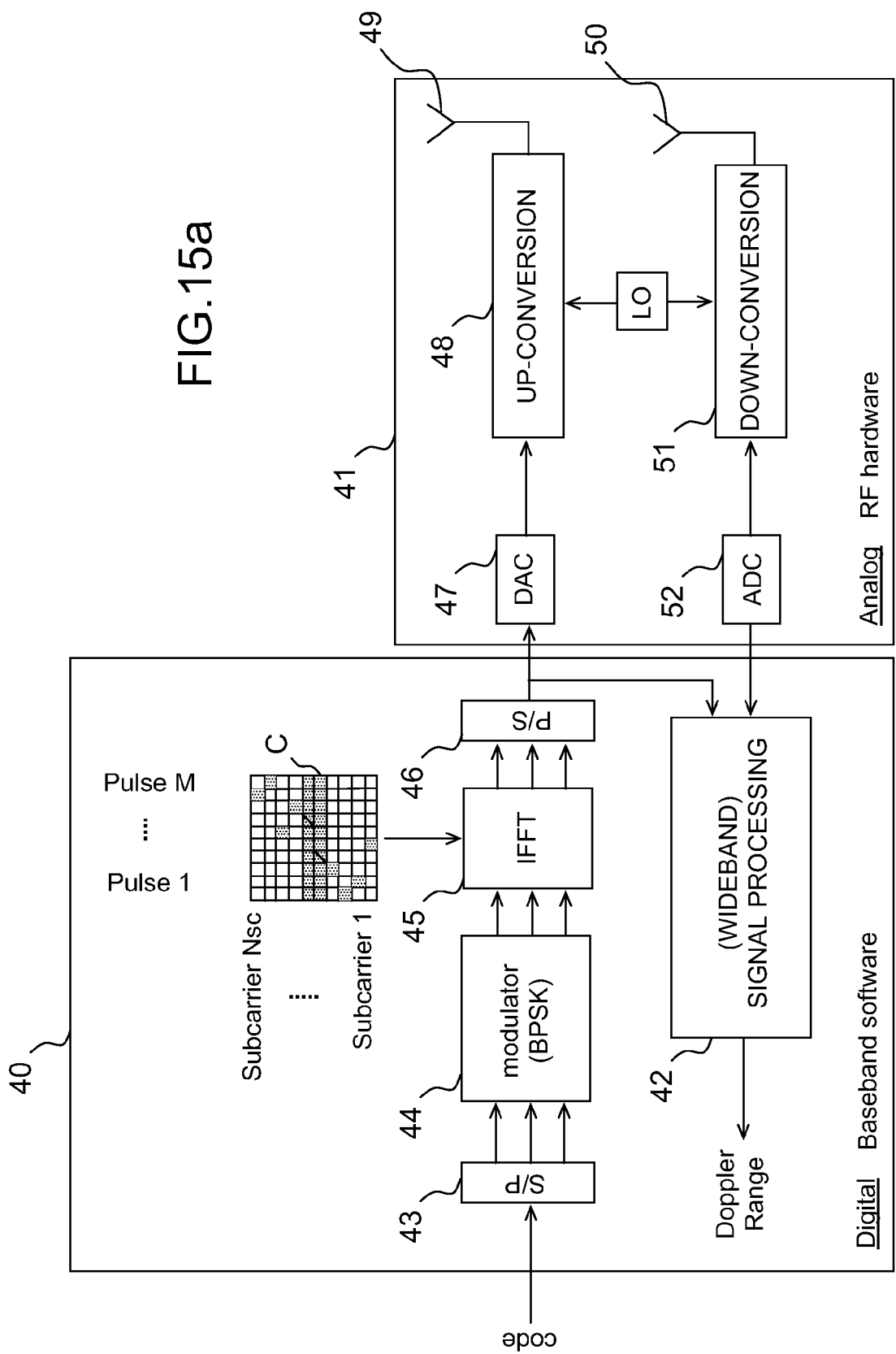
Figure 15B:
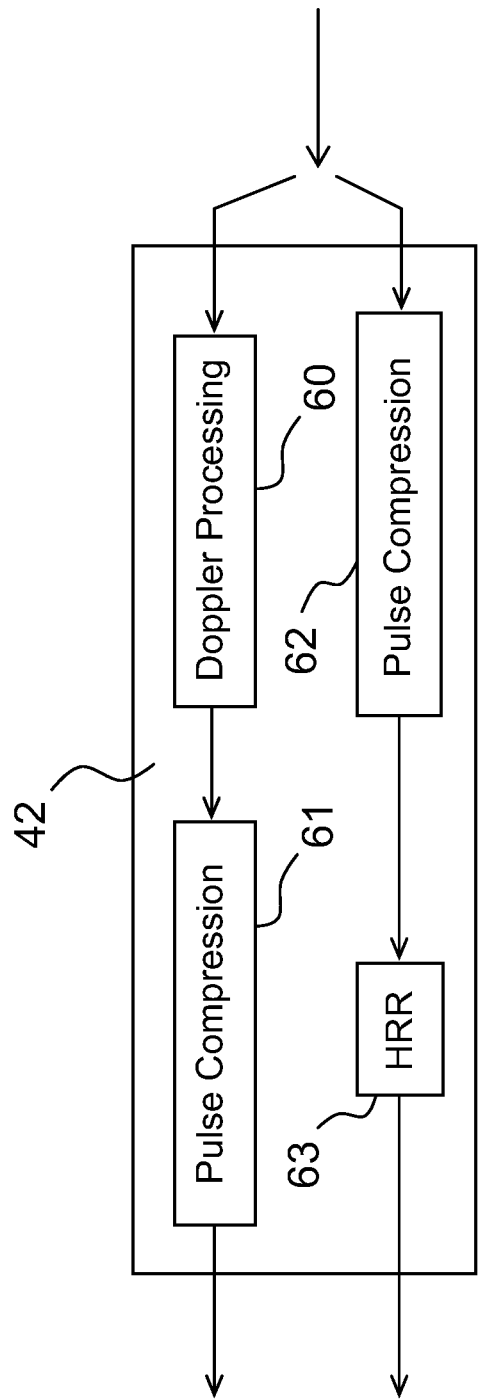
Figure 15C:
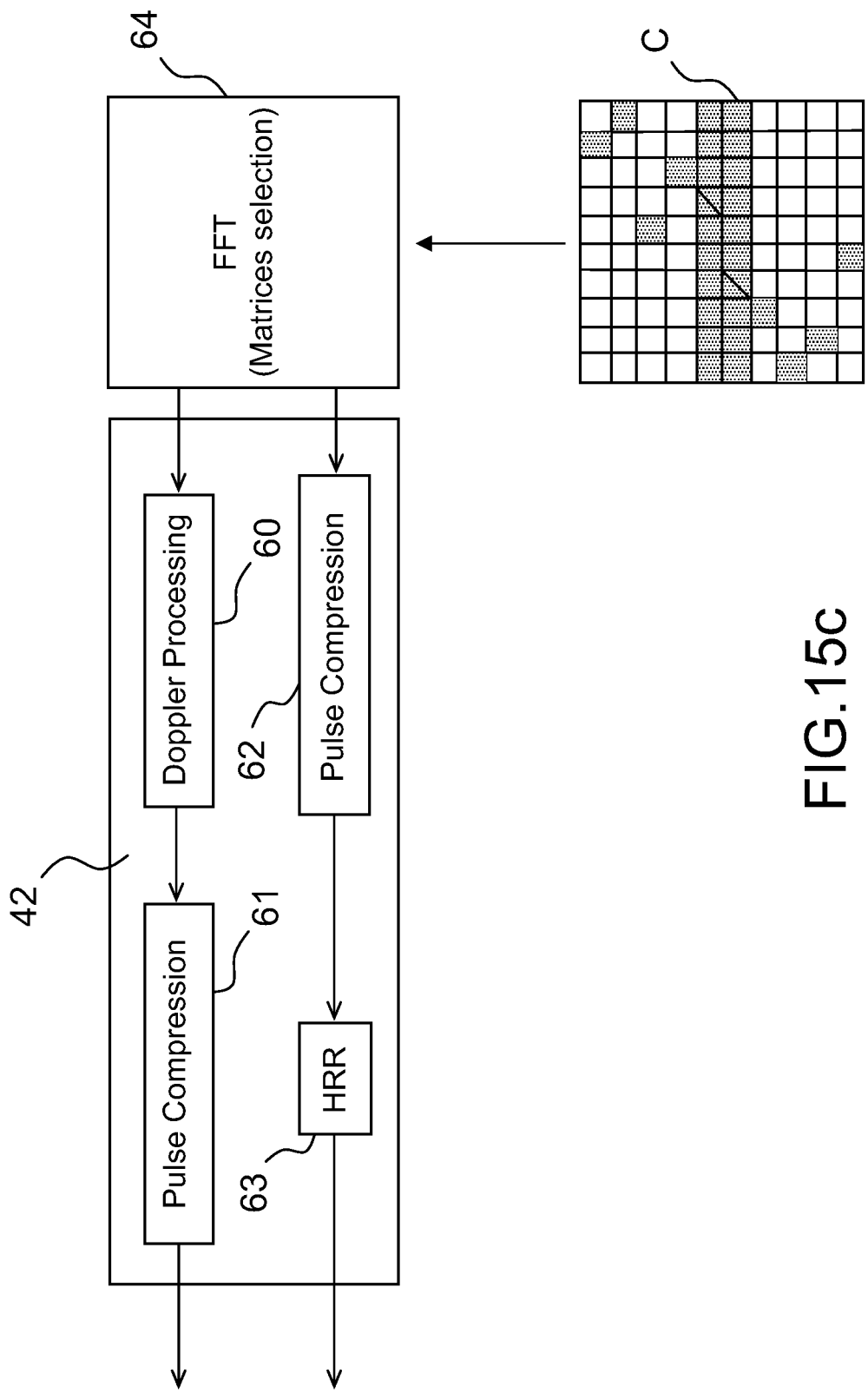

the FIG. 2a schematically illustrates exemplary grouped subcarriers hopping in the case of a single chip per pulse;

the FIG. 2b schematically illustrates exemplary spread subcarriers hopping in the case of a single chip per pulse;

the FIG. 3 schematically illustrates an exemplary OFDM structure enabling to combine frequency agility and Doppler processing;

the FIG. 4 schematically illustrates an exemplary complex down conversion scheme;

the FIG. 5 schematically illustrates an exemplary Doppler processing for pulse radar after pulse compression;

the FIG. 6a schematically illustrates an exemplary received OFDM pulse burst;

the FIG. 6b schematically illustrates an exemplary Doppler processing per subcarrier;

the FIG. 7 schematically illustrates an exemplary Doppler spectrum for MC compared to Single Carrier (SC);

the FIG. 8 schematically illustrates an exemplary frequency agile stepped OFDM waveform;

the FIG. 9 schematically illustrates an exemplary receiver for HRR;

the FIG. 10 schematically illustrates an exemplary agile HRR processing concept;

the FIG. 11 schematically illustrates an exemplary OFDM chip uBB, continuous and after sampling at the range gates for 3 targets;

the FIG. 12 schematically illustrates an exemplary sampling of the received echoes coming from different ranges;

the FIG. 13 schematically illustrates an exemplary compressed OFDM chip for two closely spaced targets;

the FIG. 14 schematically illustrates HRR exemplary profiles for two close point targets (R1=2001, R2=2002), the results being folded back in the available IFFT window;

the FIG. 15a schematically illustrates an exemplary OFDM agile radar transceiver block-scheme;

the FIG. 15b schematically illustrates a zoom on the signal processing block of the exemplary transceiver;

the FIG. 15c schematically illustrates a zoom on the signal processing block of the exemplary transceiver, when the three features are combined.

In the figures, like reference signs are assigned to like items.

An OFDM Waveform

DETAILED DESCRIPTION

Figure 1:
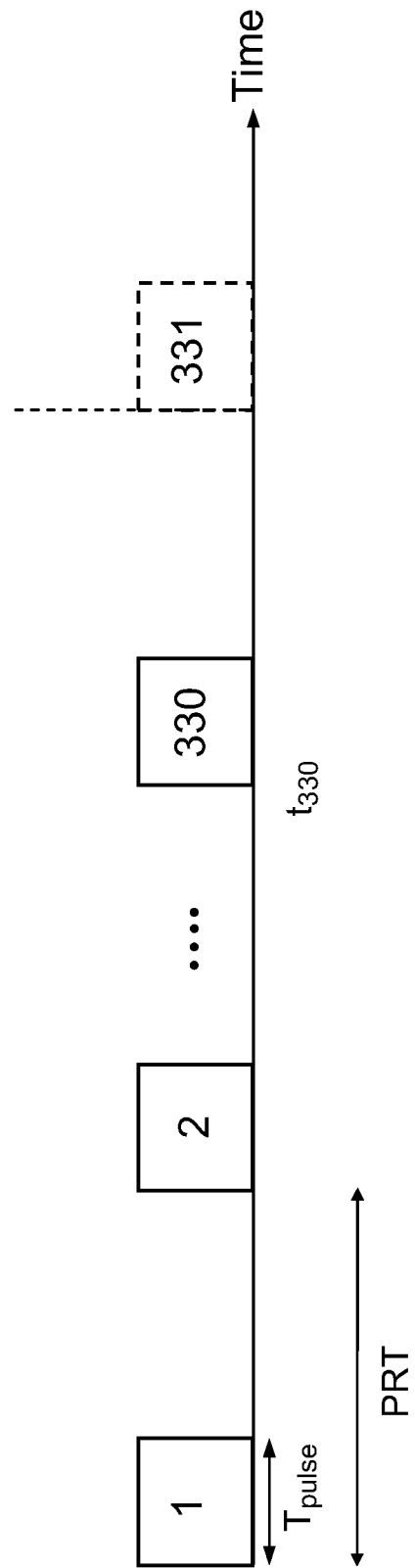

FIG. 1 schematically illustrates an exemplary waveform specified for a short range radar. The illustrated waveform is a train of 330 pulses, commonly referred to as a "pulse burst". The pulses of the burst are numbered from 1 to 330. The pulse numbered 331 is the first pulse of the next burst. The invention is exemplified on a waveform designed for short range radar with the background of radar network. The intention is to embed communication messages, for example messages indicating that objects have been detected, into the radar waveform so that information is shared between the various stations. Accordingly, the total bandwidth $B_w$ is much higher than conventional systems, for example $B_w$ may be equal to 300 megahertz (MHz). Needs for high resolution in Doppler suggest a long observation time or a Coherent Processing Interval (CPI). In the illustrated example, the duration $T_{pulse}$ of each pulse may be equal to 1 microsecond (μs) and the Pulse Repetion Time (PRT) between two consecutive pulses may be 100 μs. As a result, if the first pulse is emitted at an instant $t_1=0$, then the $330^{th}$ pulse is emitted at an instant $t_{330}=32.9$ ms and the CPI is equal to 33 milliseconds (ms) for the exemplary burst of 330 pulses. This demands treating the true Doppler effect instead of its narrowband approximation. In the illustrated example, the Bandwidth-Time product (BT) may average about $10^7$, which is extremely high compared to usual BT products averaging about $10^4$. Such a waveform offers good properties of Low Probability of Interception (LPI) when processed by Pulse Compression, since the instantaneous power can be limited. The consequence of the high BT product will be to introduce range walk at the receiver even for relatively low speed targets averaging about 15 meters per second (m/s). Range walk describes the drifting of the received echoes over the range gates. If range walk is not mitigated, it is harmful to the Doppler processing. That is why "range-walk compensation" techniques are usually applied beforehand. In the illustrated example, the targets of interest are human being in very slow motion, whose radial velocity under 10 m/s induces no range walk. Although the illustrated example is based on a high BT product waveform with its specific scenario of low targets, the invention also suits more classic radar scenarios with lower BT product of about $10^4$ for example and higher speeds of about 500 m/s for example.

Each pulse of the exemplary waveform is an OFDM pulse, commonly referred to as an "OFDM chip". A common set of $N_{sc}$ frequency carriers is used to construct each of the OFDM chips. The time/frequency structure of the pulse burst is tailored in accordance with three different patterns: one pattern for frequency agility, one pattern for Doppler processing and one pattern for HRR.

FIG. 2a and FIG. 2b schematically illustrate exemplary grouped subcarriers and exemplary spread subcarriers, respectively, hopping in the case of a single chip per pulse. All three patterns are based on the available $N_{sc}$ subcarriers associated with the OFDM pattern. With OFDM, two consecutive subcarriers are separated by $\Delta f = 1/T_s$ where $T_s$ is the duration of one OFDM symbol. This is the property of orthogonality that characterizes the spectrum of an OFDM signal. These $N_{sc}$ subcarriers capture the total available bandwidth $B_w$ according to $B_w = N_{sc} \cdot \Delta f$.

Starting with the frequency agility constraint alone, an OFDM agile waveform is easily obtained if frequency hopping schemes are used from chip to chip. An infinite number of schemes can be figured out, as illustrated by FIG. 2a and FIG. 2b, but here one constraint is to have a same number N of subcarriers for each chip ($N \leq N_{sc}$). In the exemplary FIGS. 2a and 2b, $N_{sc}=40$ and $N=8$. In the concept, one chip is a concatenation of symbols (vertical) while one pulse is a concatenation of chips (horizontal). For t satisfying $(l-1) \times T_S \leq t \leq l \times T_S$, where $l \in (1 \ldots L)$ is the chip index, the expression $s_{OFDM(t)}$ for an agile OFDM pulse at baseband is given by:

$$s_{OFDM}(t) = \sum_{k=1}^{N_{sc}} w_{k,l} e^{j\phi_{k,l}} e^{jk \cdot 2\pi \cdot \Delta f \cdot t} \quad (1)$$

where:

$w_{k,l}$ and $\phi_{k,l}$ are the weight and the phase code, respectively, associated to the $k^{th}$ subcarrier and the $l^{th}$ chip;

the frequency agility information is carried by $\{W_{k,l}\}_{k=1 \ldots N_{SC}}$ that will have only N non-zero values.

The pulse duration $T_{pulse}$ in the proposed scenario is small (1 µs), such that a single chip fits within the pulse (L=1). That is the reason why, in the following, the chip index l is replaced by a pulse index m, where $m \in (1 \ldots M)$, M being the number of pulses in the burst. At each pulse, the N non-zero values of the single chip are randomly distributed, so that the $N_{sc}$ possible subcarriers are covered over the burst of M pulses. Consequently, the total bandwidth $B_w$ is also covered over the burst of M pulses. This defines the frequency agility pattern. When sampled at the critical sampling rate $f_s = B_w = N_{sc}/T_s$, the discrete form of $s_{OFDM}[(n-1) \cdot T_s]$, with $n \in (1 \ldots N_{sc})$, becomes:

$$s_{OFDM}[e^{j\theta_n}] = \sum_{k=1}^{N_{sc}} c_{k,m} \cdot e^{jk \cdot \theta_n} \quad (2)$$

Where $\theta_n = 2\pi \Delta f \cdot (n-1) T_s$ and $C_{k,m} = W_{k,m} \cdot e^{j\Phi_{k,m}}$.

This expression resembles the definition of an Inverse Fast Fourier Transform (IFFT). Indeed, an OFDM signal is remarkable in the sense that it is easily generated by applying a digital IFFT over the complex symbols $C_{k,m}$.

An OFDM Waveform Adapted to Doppler Processing

The FIG. 3 schematically illustrates an exemplary OFDM structure enabling to combine frequency agility and Doppler processing. If on top of the agility pattern, $N_{dopp}$ fixed subcarriers are superimposed, their Doppler modulations due to the target can be tracked along the received burst and it becomes possible to use the classical Fourier theory to retrieve them. Then, the radial velocity $v_r$ can easily be computed. In the exemplary FIG. 3, the fixed subcarriers dedicated to Doppler processing are $SC1_{Dopp}$, $SC2_{Dopp}$ and $SC3_{Dopp}$ ($N_{dopp}=3$). They are not submitted to the above mentioned random distribution: they are fixed over the M pulses. Denoting by $$C = \{c_{k,m}\}_{\substack{k=1 \ldots N_{SC} \\ m=1 \ldots M}}$$

the matrix that contains the time/frequency information of the burst, one example where random agility and Doppler are combined is given by:

$$C = \begin{bmatrix} a_{1,1} & \cdots & \cdots & \cdots & \cdots & a_{1,6} & \cdots & a_{1,8} & \cdots & \cdots \\ \vdots & \cdots & a_{1,3} & \cdots & a_{1,5} & a_{2,6} & \cdots & a_{2,8} & \cdots & a_{1,10} \\ \vdots & a_{1,2} & \vdots & \cdots & \vdots & \vdots & a_{1,7} & \vdots & a_{1,9} & a_{2,10} \\ \vdots & \vdots & a_{2,3} & \cdots & \vdots & \vdots & \vdots & a_{3,8} & \vdots & a_{3,10} \\ d_{1,1} & d_{1,2} & d_{1,3} & d_{1,4} & d_{1,5} & d_{1,6} & d_{1,7} & d_{1,8} & d_{1,9} & d_{1,10} \\ d_{2,1} & d_{2,2} & d_{2,3} & d_{2,4} & d_{2,5} & d_{2,6} & d_{2,7} & d_{2,8} & d_{2,9} & d_{2,10} \\ \vdots & a_{2,2} & a_{3,3} & \vdots & \vdots & \vdots & a_{2,7} & \cdots & a_{2,9} & \cdots \\ a_{2,1} & a_{3,2} & \cdots & a_{1,4} & \cdots & a_{3,6} & \vdots & \cdots & \vdots & \cdots \\ \vdots & \cdots & \cdots & a_{2,4} & a_{2,5} & \cdots & \vdots & \cdots & a_{3,9} & \cdots \\ a_{3,1} & \cdots & \cdots & a_{3,4} & a_{3,5} & \cdots & a_{3,7} & \cdots & \cdots & \cdots \end{bmatrix} \quad (3)$$

Each column of C corresponds to one pulse, while each row of C corresponds to one subcarrier. The dots refer to zeros. The coefficients responsible for frequency agility and Doppler are denoted by the matrices $$A = \{a_{k,m}\}_{\substack{k=1 \ldots N \\ m=1 \ldots M}} \text{ and } D = \{d_{k,m}\}_{\substack{k=1 \ldots N_{dopp} \\ m=1 \ldots M}}$$

respectively. The numbers used in this example are arbitrary $N_{sc}=10$, $N=3$, $N_{dopp}=2$ and $M=10$. In order to process Doppler, it is necessary that all $N_{dopp}$ subcarriers show coherency from pulse to pulse. Therefore, the coefficients along the rows in D should be equal.

The concept for the processing at the reception of such an OFDM agile pulse burst is now described. Only one single point target is assumed in the scenario and propagation losses are excluded in the model.

At transmission, the digital signal presented in (2) is transformed by a Digital-to-Analog Converter (DAC) into an analog signal before it is up-converted, here at X-band. At Radio-Frequency (RF), every agile pulse $u_{RFTX}^m(t)$ is expressed by:

$$u_{RF\ TX}^m(t) = u_{BB}^m(t - t_m) \cdot e^{j\omega_c t} \quad (4)$$

where, $$u_{BB}^m(t) = \left[ \sum_{k=0}^{N_{sc}-1} c_{k,m} e^{jk \cdot 2\pi \cdot \Delta f \cdot (t + T_s/2)} \right] \cdot rect_{T_s}(t)$$

$$rect_{T_s}(t) = \begin{vmatrix} 1 & -T_s/2 \leq t \leq T_s/2 \\ 0 & \text{elsewhere} \end{vmatrix}$$

The time $t_m$ is taken to be the moment at which the exact middle of pulse m is transmitted, e.g. $t_0 = T_s/2$ and $t_1 = PRT + T_s/2$. For the sake of coherency from one pulse to the next, the PRT is assumed to be an integer multiple of the carrier period $T_c = 2\pi/\omega_c$.

Doppler Processing: The OFDM Waveform Echoed

At reception, if the point target is initially separated from the radar by a distance R and moving with a radial velocity $v_r$, the complex expression for each received pulse m is given by:

$$u^m_{RF\ RX}(t) = u^m_{RF\ TX}(\sigma(t-\tau)) \quad (5)$$
$$= e^{j(\omega_c + \omega_D)(t-\tau)} \cdot u^m_{BB}(\sigma(t-\tau) - t_m)$$

where $\sigma = (c-v_r)/(c+v_r) \overset{|v_r| \ll c}{\approx} 1 - 2v_r/c$ is the time scaling factor used to describe the true Doppler effect and $\omega_D = -(2v_r/c)\omega_c$ is the Doppler modulation on the RF carrier. Receding targets ($v_r > 0$) induce negative Doppler while closing targets ($v_r < 0$) produce positive Doppler. The two-way travel time delay $\tau$ is given by $\tau = 2R/(c-v_r) \approx 2R/c$.

FIG. 4 schematically illustrates an exemplary complex down conversion scheme. A received signal $S_{RF}(t)$ is mixed down with a local oscillator 10 into a signal $s_{BB}(t)$, then sampled by an Analog-to-Digital Converter 11 (ADC) into $S_{BB}[t_n]$, before it is gated as illustrated by an item 12 of Additive White Gaussian Noise. The latter means that only few samples corresponding to the range gates are picked. This is usually equivalent to down sampling but the actual behavior does not matter here.

Finally, the samples are lead through a pulse compression filter to perform the range processing in a Digital Signal Processor 13 (DSP).

FIG. 5 schematically illustrates an exemplary Doppler processing for a pulse 1 to a pulse P after pulse compression, in a conventional system. The down converted signal $u_{BBRX}{}^m(t)$ is expressed by:

$$u_{BBRX}{}^m(t) = e^{-j\omega_c \tau} \cdot e^{j\omega_D(t-\tau)} \cdot u_{BB}{}^m(\sigma(t-\tau) - t_m) \quad (6)$$

The range gates are conventionally separated by a range cell, whose size is equal to the range resolution ($\delta R = c/2 \cdot \delta \tau$, with $\delta \tau = 1/B_W$. If during each PRT there are P range gates ($t_1 \ldots t_P$) the full range gate matrix R, will be $$R = \frac{c}{2} \cdot T,$$

where:

$$T = \begin{bmatrix} t_1 & \cdots & t_P \\ \vdots & \ddots & \vdots \\ (M-1) \cdot PRT + t_1 & \cdots & (M-1) \cdot PRT + t_P \end{bmatrix} \quad (7)$$

If the delay $\tau$ is within the interval $[t_p, t_{p+1}]$, the received pulse $u_{BBRX}{}^{m=1}$ will have its $N_{sc}$ samples taken at the time instants ($t_{p+1} \ldots t_{p+N_{sc}}$) and provided that the offset between the first sampling instant and the delay is $\Delta \tau = t_{p+1} - \tau$, the $n^{th}$ sample is given by:

$$u^{m=1}_{BB\ RX}(t_{p+n}) = e^{-j\omega_c \tau} \cdot e^{j\omega_D(\Delta\tau + (n-1)\delta\tau)} \cdot \left[ \sum_{k=1}^{N_{sc}} c_{k,0} e^{jk \cdot 2\pi \cdot \Delta f \cdot (\Delta\tau + (n-1)\delta\tau)} \right] \quad (8)$$

In (8), the scaling of the pulse itself is neglected that is why the frequency terms in the summation are not affected, according to (3). However, the scaling of the PRT cannot be ignored and the echo of the next pulse will appear drifted on the range gate scale. Calling $\tau_2$ the time instant of its reception, it follows:

$$\tau_2 = \tau_1 + PRT(1 + v_r) \quad (9)$$

If very low radial speeds are assumed, then $\tau_2$ can be assumed to be within the corresponding interval $[PRT+t_p, PRT+t_{p+1}]$. In that case the new delay $\Delta \tau_2$ is equal to:

$$\Delta\tau_2 = PRT + t_{p+1} - \tau_2 = \Delta\tau_1 - v_r \cdot PRT \quad (10)$$

Taking $\tau_1 = \tau$, $\Delta\tau_1 = \Delta\tau$. With the condition that all echoes are falling into the same range cell, meaning there is no range walk, the Doppler processing will operate over the $M \times N_{sc}$ samples available. Expanding (10) to all echoes:

$$\Delta\tau_m = \Delta\tau_1 - v_r \cdot (m-1)PRT \quad (11)$$

Doppler Processing of the OFDM Waveform Echoed

FIG. 6a schematically illustrates an exemplary received OFDM burst of 330 pulses. FIG. 6b schematically illustrates an exemplary Doppler processing per subcarrier. An expression equivalent to (8) can be sorted out for each sample n from pulse m:

$$u^m_{BB\ RX}(t_{p+n}) = e^{-j\omega_c \tau} \cdot e^{j\omega_D(\Delta\tau - v_r(m-1)PRT + (n-1)\delta\tau)} \cdot \left[ \sum_{k=1}^{N_{sc}} c_{k,m} e^{jk \cdot 2\pi \cdot \Delta f \cdot (\Delta\tau - v_r(m-1)PRT + (n-1)\delta\tau)} \right] \quad (12)$$

Based on the assumption of no range walk, the algorithm disclosed proposes a Doppler processing per subcarrier. Since the two processes are linear they can be reversed. Therefore, the Doppler processing is considered on the raw samples introduced in (12) before pulse compression. The idea of the Doppler processing is to follow the phase evolution of all $N_{dopp}$ subcarriers according to (3) along the CPI or from PRT to PRT.

To retrieve the $N_{dopp}$ phases at each PRT, the first step of the algorithm consists in applying an $N_{sc}$ FFT points over all M sets of samples $$\{u^m_{BB\ RX}(t_{p+n})\}_{\substack{m \\ n=1 \ldots N_{sc}}}.$$

In the output, the phase contains the information, therefore the $N_{dopp}$ phases are kept in the vector $\phi_m = (\phi_{m,1} \ldots \phi_{m,N_{dopp}})$ while the other $N_{SC} - N_{dopp}$ are disregarded. Then the phase matrix $\phi$ is formed:

$$\Phi = \begin{bmatrix} \varphi_{1,1} & \cdots & \varphi_{1,N_{dopp}} \\ \vdots & \ddots & \vdots \\ \varphi_{M,1} & \cdots & \varphi_{M,N_{dopp}} \end{bmatrix} \quad (13)$$

The second part of the algorithm is again a Fourier analysis since M FFT points are performed over each of the $N_{dopp}$ columns in $\phi$. The $N_{dopp}$ Doppler spectra are produced and collected in the matrix F:

$$F = \begin{bmatrix} f_{1,1} & \cdots & f_{1,N_{dopp}} \\ \vdots & \ddots & \vdots \\ f_{M,1} & \cdots & f_{M,N_{dopp}} \end{bmatrix} \quad (14)$$

FIG. 7 schematically illustrates one exemplary Doppler spectrum.

An OFDM Waveform Adapted to HRR Processing

The OFDM structure also enables the combination of frequency agility and HRR. To this end, a different time/frequency pattern than in the previous case will be proposed. The general idea behind HRR is to synthesize a higher range resolution than the theoretical range resolution ($\delta R = c/2B$), which is limited by the bandwidth. In the current analysis, the limiting factor is not the bandwidth ($B_w = 300$ MHz in the scenario) but the needs for frequency agility. Indeed, in the context of interference, the reduction of the instantaneous bandwidth is necessary. In that sense, the concept of HRR is compatible with the frequency agile wideband radar. The combination of agility and HRR requires an adapted waveform. The proposed solution makes use of grouped subcarriers for each pulse and allocates to each group different sub bands. Over the burst, the full band is covered in a random fashion.

FIG. 8 schematically illustrates an exemplary frequency agile stepped OFDM waveform. Only a small set of $N_{HRR}$ neighboring subcarriers is used in each chip to form a pulse. The frequency $f_m = n_m \cdot \Delta f$ specifies the frequency band for pulse m. Therefore, the frequency agility information is now contained in the vector $A = (n_1 \ldots n_m)$. Note that no overlap between these bands is considered in the current analysis. For the sake of coherency, neither phase coding nor frequency coding is applied on the OFDM signal, i.e. $\phi_{k,i} = 0$ and $w_{k,i} = 1$. Similar to (3), a time/frequency matrix of the coefficients C is showed as an example in (15):

$$C = \begin{bmatrix} \ldots & \ldots & \ldots & \ldots & \ldots & \ldots & \ldots & \ldots & h_{1,9} & \ldots \\ \ldots & \ldots & \ldots & \ldots & \ldots & \ldots & \ldots & \ldots & \ldots & h_{1,10} \\ \ldots & \ldots & \ldots & \ldots & \ldots & h_{1,6} & \ldots & \ldots & \ldots & \ldots \\ \ldots & \ldots & \ldots & \ldots & \ldots & \ldots & \ldots & h_{1,8} & \ldots & \ldots \\ \ldots & \ldots & \ldots & \ldots & \ldots & \ldots & h_{1,7} & \ldots & \ldots & \ldots \\ \ldots & \ldots & \ldots & h_{1,4} & \ldots & \ldots & \ldots & \ldots & \ldots & \ldots \\ \ldots & \ldots & h_{1,3} & \ldots & \ldots & \ldots & \ldots & \ldots & \ldots & \ldots \\ h_{1,1} & \ldots & \ldots & \ldots & \ldots & \ldots & \ldots & \ldots & \ldots & \ldots \\ \ldots & h_{1,2} & \ldots & \ldots & \ldots & \ldots & \ldots & \ldots & \ldots & \ldots \\ \ldots & \ldots & \ldots & \ldots & h_{1,5} & \ldots & \ldots & \ldots & \ldots & \ldots \end{bmatrix} \quad (15)$$

Only one subcarrier is dedicated to HRR but the concatenation of more subcarriers is an option when more frequencies are available.

HRR Processing: The OFDM Waveform Echoed

The HRR processing is clear when the expression of the transmitted RF pulses in (4) is slightly modified as in (16) and (17). Each pulse has its own carrier frequency $f_c + f_m$, also used as local oscillator to do the down mixing at the receiver:

$$u_{BB}^m(t) = e^{j\omega_m t} \cdot u_{BB}(t - t_m) \quad (16)$$

where, $$u_{BB}(t) = \left[ \sum_{k=0}^{N_{HRR}-1} e^{jk \cdot 2\pi \cdot \Delta f \cdot (t+T_s/2)} \right] \cdot rect_{T_s}(t)$$

$$u_{RFTX}^m(t) = e^{j\omega_c t} \cdot u_{BB}^m(t) \quad (17)$$

For the sake of coherency, the PRT is assumed to be an integer multiple of the carrier period $T_c = 2\pi/\omega_c$. Assuming very slow moving target (no range walk), the complex expression for each received pulse m is given by:

$$u_{RF\,RX}^m(t) = u_{RF\,TX}^m(\sigma(t - \tau)) \quad (18)$$

$$\approx e^{j(\omega_c + \omega_D)(t-\tau)} \cdot u_{BB}^m(\sigma(t - \tau))$$

FIG. 9 schematically illustrates an exemplary receiver for HRR. It comprises a Local Oscillator 20 (LO) and a Pulse Compression block 21. After down mixing, each pulse is expressed by:

$$u_{BBRX}^m(t) = u_{RFRX}^m(t) \cdot e^{-j(\omega_c + \omega_m)t} \quad (19)$$

By substituting the $m^{th}$ term of (16) and (18) for $u_{RFRX}^m$, it follows:

$$u_{BBRX}^m(t) = e^{-j(\omega_c + \omega_m)\tau} q_m(t-\tau) \quad (20)$$

Where:

$$q_m(t) = e^{j\omega_D(t-\tau)} u_{BB}(t-\tau-t_m) \quad (20)$$

If the target's speed is high, the received waveform suffers from scaling. The PRT of the received burst is modified and in that case, it would be more correct to introduce $\tau_m$ as the delay for the $m^{th}$ pulse. Although the wideband Doppler analysis is introduced here, an invariant delay $\tau$ is taken for all pulses. The short pulses are not affected by scaling neither, therefore the Doppler modulations on the $N_{HRR}$ subcarriers can be neglected like in (18).

The basic range resolution of the signal $u_{BB}$ in (16) is determined by pulse compression. The impulse response $h_m = h$ of the pulse compression filter is matched to the shape $q_m = q$ of the received pulse. Therefore, in principle it is given by:

$$h(t) = \overline{q(-t)} \quad (22)$$

where the line indicates complex conjugation. The function g is defined as the convolution of the received pulse q and the impulse response h of the receiver:

$$g(t) = \int_{-\infty}^{\infty} q(t-\alpha) h(\alpha) d\alpha \quad (23)$$

All choices in the design of the pulse shape and the pulse compression filter that are relevant to HRR are captured in the function g. For a stationary target as in the next simulations, it is equal to the autoconvolution of the OFDM pulse shape:

$$g(t) = \int_{-\infty}^{\infty} u_{BB}(t-\alpha) \overline{u_{BB}(-\alpha)} d\alpha \quad (24)$$

The signal $x_m$ at the output of the receiver due to the $m^{th}$ pulse is the convolution of the mixer output $u_{BBRX}^m$ and the impulse response h of the pulse compression filter. It can be expressed in terms of the function g:

$$x_m(t) = e^{-j(\omega_c + \omega_m)\tau} g(t-\tau-t_m) \quad (25)$$

The output $x_m$ of the receiver is also the input to the part of the processing that is specific to the HRR. Therefore (23) is a key to the design of this processing. In principle, this design is based on a detailed analysis of the first factor, but ignores the second one. The actual choice of the function g and the sampling of the function $x_m$ must be such that the second factor can be regarded as a constant function of the pulse number m. To avoid extra phase perturbations it is convenient if the compressed pulse is real. A sufficient condition to have the compressed pulse g being real is that the uncompressed pulse $u_{BB}$ is complex symmetrical. To be complex symmetrical, a pulse p should verify:

$$p(-t)=\overline{p(t)}, t\in \mathcal{R} \quad (38)$$

The OFDM pulse $u_{BB}$ has this property. In this theoretical analysis the receiver output signal $x_m$ is assumed to be sampled at the exact moments $\Delta t_m=(\tau+t_1 \ldots \tau+t_M)$.

HRR Processing of the OFDM Waveform Echoed

With the sampling instants $\Delta t_m$ the data samples $x_m(\Delta t_m)$ in the time domain are now meaningful in the frequency domain. Their expression $X_m(\omega_m)$ obeys:

$$X_m(\omega_m) = x_m(\Delta t_m) \quad (27)$$
$$= e^{-j\omega_m \tau} \cdot e^{-j\omega_c \tau} \cdot g(0)$$

Only the first term has a dependency on m. This remark is the basis of HRR analysis. Since the agility pattern $A=(n_1 \ldots n_M)$ introduced above, is known at the receiver, compensation for the non-linear frequency steps is possible before the HRR processing is effective.

FIG. 10 schematically illustrates an exemplary agile HRR processing concept. An Agility Pattern block 30 reorders the sequence $(X_1(\omega_1) \ldots X_M(\omega_M))$ into a new sequence $(Y_1(\Omega_1) \ldots Y_M(\Omega_M))$ such that $(\Omega_m)_{m=1 \ldots M}$ follows a linear progression. Thereafter, the new set of samples can be processed by an IFFT block 31. The output vector $(y_1(\tau_1) \ldots y_M(y_M))$ provides the HRR range profile. The burst considered in the example is composed of a small number of pulses (M=10) and the same agility pattern like in FIG. 8 is used.

FIG. 11 schematically illustrates an exemplary OFDM chip $u_{BB}$, continuous and after sampling at the range gates for 3 targets including a target 1 and a target 2. A third target corresponds to dark samples obtained at the zero-crossings, where range coincide with a multiple (k) of the range gate. The specifications for the design of the OFDM chip $u_{BB}$, as used in the simulations, are reported in a table 1:

TABLE 1

| OFDM specifications | | | |
|---|---|---|---|
| Parameter | | Value | Dimension |
| Total Bandwidth | $B_w$ | 300 | [MHz] |
| Number of subcarriers available | $N_{sc}$ | 300 | |
| Frequency spacing | $\Delta f$ | 1 | [MHz] |

TABLE 1-continued

| OFDM specifications | | | |
|---|---|---|---|
| Parameter | | Value | Dimension |
| Symbol duration | $T_s$ | 1 | [µs] |
| Bandwidth per pulse | B | 30 | [MHz] |
| Number of subcarriers per pulse | $N_{HRR}$ | 30 | |
| Sampling frequency | $f_s = B$ | 30 | [MHz] |

Since in practice, the receiver processes one sample per range gate, where each range gate has a width equal to the range resolution after pulse compression, the simulations are performed with a sampling frequency $f_s=1/\delta_\tau=B$. As illustrated by FIG. 11, if the range of one target coincides with a range gate, the central sample exhibits a high spike and the rest is zero. At this time instant, the phases of all subcarriers add constructively. In the rest they add destructively.

FIG. 12 schematically illustrates an exemplary sampling of the received echoes coming from different ranges. If the range does not coincide with any range gate, then the samples collected are no longer zero. In that case the sampling instants are $\Delta t_m + \epsilon$ where $\epsilon$ is the difference between the first range gate and R. In the simulation, two point targets are located at ranges $R_1=2001$ m and $R_2=2002$ m from the radar transceiver. The sampling of both echoes following the explanation of FIG. 12 is also reported in FIG. 11.

FIG. 13 schematically illustrates an exemplary compressed OFDM chip for two closely spaced targets. If both echoes were processed separately, the output $x_1(t)$ of the pulse compression would be identical to FIG. 13. Note that the reference signal $\overline{u_{BB}(-\alpha)}$ in (24) corresponds to the dark samples in FIG. 11. Because their separation in range is less than the resolution after pulse compression ($\delta t=5$ m), the two targets fall in the same bin and cannot be resolved. Therefore, the additional HRR is needed to discriminate between them. The range resolution is improved by M, $\delta r_{HRR}=\delta r/M$.

FIG. 14 schematically illustrates HRR exemplary profiles for two close point targets (R1=2001, R2=2002), the results being folded back in the available IFFT window. The HRR profiles $(y_1(\tau_1) \ldots y_M(y_M))$ of these two targets are plotted. The peaks are now located two bins apart so that the two targets can be resolved.

An OFDM Waveform Adapted to Doppler and HRR Processing

The combination of the three features becomes possible when the time/frequency pattern of the emitted waveform includes all three characteristics, as in the exemplary matrix C:

$$C = \begin{bmatrix} \ldots & \ldots & \ldots & \ldots & \ldots & \ldots & \ldots & \ldots & h_{1,9} & \ldots \\ \ldots & \ldots & \ldots & \ldots & \ldots & \ldots & \ldots & \ldots & \ldots & h_{1,10} \\ \ldots & \ldots & \ldots & \ldots & \ldots & h_{1,6} & \ldots & \ldots & \ldots & \ldots \\ \ldots & \ldots & \ldots & \ldots & \ldots & \ldots & \ldots & h_{1,8} & \ldots & \ldots \\ d_{1,1} & d_{1,2} & d_{1,3} & d_{1,4} & d_{1,5} & d_{1,6} & h_{1,7}=d_{1,7} & d_{1,8} & d_{1,9} & d_{1,10} \\ d_{2,1} & d_{2,2} & d_{2,3} & h_{1,4}=d_{2,4} & d_{2,5} & d_{2,6} & d_{2,7} & d_{2,8} & d_{2,9} & d_{2,10} \\ \ldots & \ldots & h_{1,3} & \ldots & \ldots & \ldots & \ldots & \ldots & \ldots & \ldots \\ h_{1,1} & \ldots & \ldots & \ldots & \ldots & \ldots & \ldots & \ldots & \ldots & \ldots \\ \ldots & h_{1,2} & \ldots & \ldots & \ldots & \ldots & \ldots & \ldots & \ldots & \ldots \\ \ldots & \ldots & \ldots & \ldots & h_{1,5} & \ldots & \ldots & \ldots & \ldots & \ldots \end{bmatrix} \quad (28)$$

FIG. 15a schematically illustrates an exemplary OFDM agile radar transceiver block-scheme. It comprises a digital block 40 providing baseband software functionalities and an analog block 41 providing RF hardware functionalities. The digital block 40 comprises a Wideband Signal Processing block 42. FIG. 15b and FIG. 15c schematically illustrate a zoom on the Signal Processing block 42 of the exemplary transceiver. The Signal Processing block 42 comprises a Doppler Processing block 60, a Pulse Compression block 61, a Pulse Compression block 62 and an HRR block 63. FIG. 15c schematically illustrates a zoom on the Signal Processing block 42, when the three features are combined, the Signal Processing block 42 being fed by an FFT block 64. It is worth noting that the invention disclosed suits any conventional OFDM transceiver for wireless communications. In the transmitter, a serial data stream or code, depending on the type of information to be transmitted, is first made parallel by a Serial-to-Parallel block 43 (S/P), then modulated in a block 44 and assigned to subcarriers 1 to $N_{sc}$. The assignment of the symbols is dictated by the Frequency Agile pattern. The frequencies intended to process the Doppler are not coded. Such a modulated signal in the discrete frequency domain is transformed into the time domain by an IFFT block 45, and the parallel data stream is made serial again by a Serial-to-Parallel block 46 (S/P). Such a discrete—time agile OFDM signal is converted to its analog version by a Digital-to-Analog Converter 47 (DAC), then up-converted to the main carrier by an Up-Conversion block 48 and finally sent by an antenna 49 to the air. In the receiver, the reverse process is performed by virtue of an antenna 50 and a Down-Conversion block 51, until digitization by an Analog-to-Digital Converter 52 (ADC). Then the samples are fed to the Signal Processing block 42 where they undergo simultaneously Doppler and HRR processing according to the invention.

At the receiver, the set of subcarriers dedicated to the Doppler processing $$D = \{d_{k,m}\}_{\substack{k=1 \ldots N_{dopp} \\ m=1 \ldots M}}$$

are selected and separated from the other set of subcarriers necessary to perform HRR, $$H = \{h_{k,m}\}_{\substack{k=1 \ldots N_{HRR} \\ m=1 \ldots M}}.$$

This selection requires an extra block that converts the received echoes into the frequency domain, as illustrated in FIG. 15c. It is also worth noting that the Doppler analysis works with the uncompressed samples: as illustrated by FIG. 15b, the Doppler Processing block 60 may operate prior to the Pulse Compression block 61.

It is to be understood that variations to the examples described herein, such as would be apparent to the skilled addressee, may be made without departing from the scope of the present invention. The invention is not restricted to the field of short range radar network. It can be extended to conventional radar systems where the constraint over the Bandwidth and the CPI are less stringent than in the situation exposed above.

By increasing the amount of digitization in the transceiver, the flexibility of the radar architecture is improved.

The invention claimed is:

1. A method for estimating a position and speed of a target using a radar, the radar emitting a waveform comprising a train of M pulses, where M≥2, each pulse comprising an Orthogonal Frequency Division Multiplexing chip constructed from $N_{sc}$ subcarriers, where $N_{sc} \geq 2$, the subcarriers covering an entirety of the bandwidth of the radar, the method comprising, upon receipt of echoed pulses by the radar:

among the $N_{sc}$ subcarriers, Doppler processing $N_{dopp}$ subcarriers using at least one processor, where $N_{dopp} < N_{sc}$, each of said $N_{dopp}$ subcarriers being fixed over the M pulses; and among $N_{sc} - N_{dopp}$ subcarriers that are not used for Doppler processing, High Range Resolution processing $N_{HRR}$ subcarriers using at least one processor, where $N_{HRR} \leq N_{sc} - N_{dopp}$, said $N_{HRR}$ subcarriers being randomly distributed over the M pulses.

2. The method according to claim 1, further comprising compressing the echoed pulses following Doppler processing.

3. The method according to claim 1, wherein the Doppler processing comprises applying a Fast Fourier Transform on each echoed pulse to select the $N_{dopp}$ subcarriers to be used for Doppler processing.

4. The method according to claim 1, further comprising compressing the echoed pulses before High Range Resolution processing.

5. The method according to claim 1, wherein High Range Resolution processing comprises removing a random distribution of the $N_{HRR}$ subcarriers.

6. The method according to claim 1, wherein one or more messages indicating that the target has been detected are embedded in the waveform, the messages being exchanged throughout a radar network.

7. The method according to claim 6, wherein a Bandwidth-Time product of the waveform is greater than $10^4$.

8. The method according to claim 6, wherein the radar is a short range radar configured to detect human beings.

* * * * *